United States Patent [19]

Sheets

[11] Patent Number: 4,889,160
[45] Date of Patent: Dec. 26, 1989

[54] ANTITAMPER VENT ARRANGEMENT FOR A RECEPTACLE OR ENCLOSURE

[76] Inventor: Johnny S. Sheets, 1936 Old Salisbury Rd., Winston-Salem, N.C. 27127

[21] Appl. No.: 291,167

[22] Filed: Dec. 28, 1988

[51] Int. Cl.⁴ .............................................. F16K 24/00
[52] U.S. Cl. .................................... 137/588; 137/350; 137/384; 137/549; 220/371; 105/358
[58] Field of Search ............... 137/544, 549, 588, 347, 137/350, 384; 105/358; 210/241; 220/214, 373, 374, 371, 372

[56] References Cited

U.S. PATENT DOCUMENTS

| | | | |
|---|---|---|---|
| 1,307,494 | 6/1919 | Hawxhurst | 137/588 |
| 1,719,932 | 5/1927 | Holtson | 220/44 A |
| 2,217,056 | 10/1940 | Johnson | 137/384 |
| 2,299,183 | 10/1942 | Shanor | 220/214 |
| 2,946,475 | 3/1957 | Rockelman | 220/18 |
| 3,451,584 | 6/1969 | Degaetano | 220/371 |
| 3,902,632 | 9/1975 | Baker et al. | 220/372 |
| 4,147,096 | 4/1979 | Caswell | 220/374 |
| 4,323,096 | 4/1982 | Dugge et al. | 137/350 |
| 4,358,908 | 11/1982 | Song | 220/373 |
| 4,765,499 | 8/1988 | Von Reis et al. | 220/371 |

Primary Examiner—A. Michael Chambers
Attorney, Agent, or Firm—Wigman & Cohen

[57] ABSTRACT

A two-way tamper-proof vent arrangement especially constructed for food grade receptacles and tanks is disclosed. The vent arrangement includes inner and outer stainless steel inverted cup members which are nested together and are concentrically mounted on a bracket over a tubular vent opening in the receptacle or tank. The outer cup member has a lower circumferential edge which bears on the surface of the receptacle or tank surrounding the vent opening so that tubes or other instruments cannot gain access to the vent opening. The inner cup member has a lower circumferential edge spaced from the surface of the receptacle surrounding the vent opening. The outer cup member is provided with a plurality of small openings to permit the inflow and outflow of venting air along a labyrinth path formed by the inner and outer cup members between the exterior of the outer cup member and the vent opening.

19 Claims, 2 Drawing Sheets

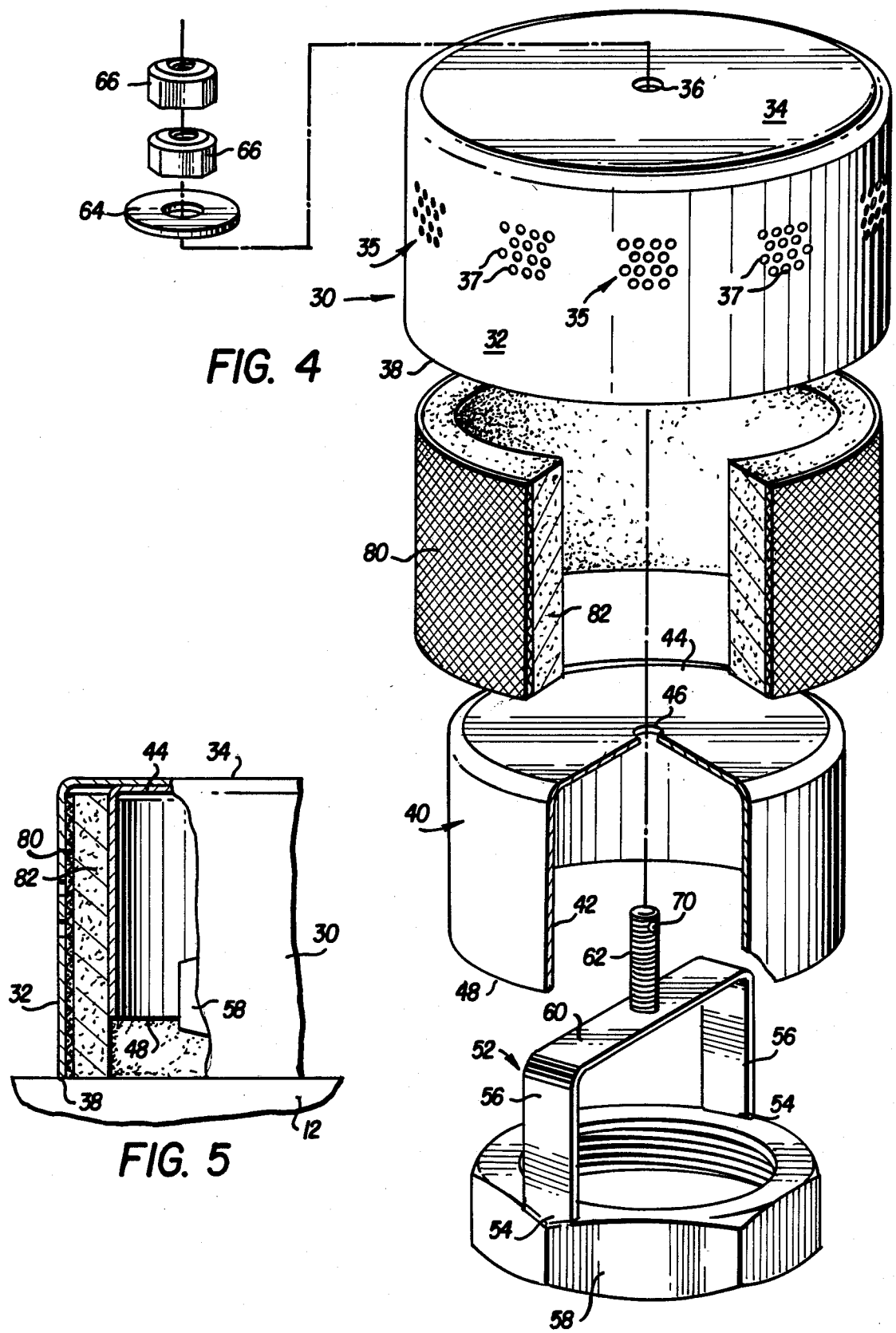

ANTITAMPER VENT ARRANGEMENT FOR A RECEPTACLE OR ENCLOSURE

FIELD OF THE INVENTION

The present invention relates to vents for receptacles or enclosures and more particularly to a vent arrangement which permits two-way flow between the atmosphere and the interior of a receptacle or enclosure, yet protects the contents thereof from contamination or tampering.

DESCRIPTION OF THE PRIOR ART

The prior art is replete with many forms of two-way vents for receptacles, such as railway tanks, truck vehicle tanks, stationary tanks and the like, as well as vents for enclosures, such as buildings, housings for machinery and other apparatus maintained in an enclosed environment. Many of the conventional vents perform the venting function in an entirely satisfactory manner and in some cases even provide adequate protection against the entry of insects and other foreign matter into the interior of the vented receptacle or enclosure.

There is a growing concern in many industries with the possibility of intentional contamination of the contents of tanks, receptacles or enclosures by persons, such as vandals, disgruntled employees or former employees and emotionally disturbed individuals. This concern is especially acute in the food industry where the lives and health of food consumers are of paramount importance. Although the present invention is not limited to satisfying a need only in the food industry, it is in the context of that particular industry that the problem is described herein and is addressed by a preferred embodiment of the present invention.

In the food industry, foodstuffs in liquid or particulate form are often transported overland by rail or highway in large receptacles known as food grade tanks or containers. An example of such foodstuffs is corn syrup which is used in the manufacture of carbonated beverages, i.e., "soft drinks," as well as many other edible food products. Because of atmospheric temperature variations that occur during transport of the receptacles containing the foodstuffs, it is necessary to provide a two-way vent structure on the receptacle to avoid the build-up of pressure or the creation of a vacuum inside the receptacle.

Typically, a two-way vent is provided on the hatch cover or lid of the receptacle through which the foodstuff is introduced into the receptacle. While conventional vents used for such receptacles are adequate to provide proper venting, they do not provide an adequate solution to the problem of intentionally induced contamination. Those vent structures that do provide a measure of tamper-proofing are in many cases overly complex in design or construction rendering them uneconomical for widespread use.

SUMMARY OF THE INVENTION

In view of the foregoing limitations and shortcomings of the prior art devices, as well as other disadvantages not specifically mentioned above, it should be apparent that there still exists a need in the art for a vent structure for receptacles and enclosures which provides safe two-way venting of the receptacle or enclosure and which is designed to prevent intentional contamination of the contents of the receptacle or enclosure, as well as contamination by natural causes, such as insects or other airborne foreign matter.

The two-way vent of the present invention comprises a pair of cylindrical, inverted cup members closed at one end and open at the other end. The cup members have different diameters and heights, the inner cup member having a smaller height and diameter and being nested within the larger diameter or outer cup member with the closed ends of the cup members in contacting relation. The cylindrical wall of the outer cup member is provided with a plurality of openings spaced in groups about the circumference thereof. Each group of openings is centered at a distance from the open end of the outer cup member slightly more than half the height of the cylindrical wall of the outer cup member.

The inverted inner and outer cup members are secured to an upstanding bolt or threaded stud mounted on a C-bracket welded to a vent nut which is internally threaded so as to engage an externally threaded tubular sleeve or neck disposed in an opening, for example, in the hatch cover or lid of the receptacle. The lowermost edge of the open end of the outer cup member engages the surface of the receptacle cover around the vent opening in a non-sealing but closely spaced manner. Such arrangement prevents the introduction of a hose, tube or other tampering implement, underneath the edge of the outer cup member, yet at the same time permits flow outwardly of any contaminant that might be introduced or flooded through the openings in the cylindrical wall of the outer cup member.

The lowermost edge of the open end of the inner cup member is spaced a distance above the surface of the receptacle cover but below the upper surface of the vent nut. The above-described arrangement provides a sinuous or labyrinth flow path between the interior of the receptacle and the atmosphere outside the outer cup member.

In alternative embodiments of the vent of the invention, additional filter means may be disposed in the annular space between the cylindrical walls of the inner and outer cup members. Such filter means may comprise a metal mesh screen, a corrugated paper filter or a nonwoven fibrous filter or combinations of such filter means. Although relatively small openings (on the order of 1/16" to 3/16") in the wall of the outer cup member are preferred, it is possible to provide a series of larger, circumferentially spaced holes in the wall of the cup member and to attach a rigid metal screen member over each hole, such as by welding or otherwise affixing the screen member to the inside wall of the outer cup member.

The upstanding threaded stud on the C-bracket is provided with a diametrical through hole adjacent the free end thereof. After complete assembly of the vent structure, a seal wire is passed through the hole in the stud and secured in a loop with a lead seal or the like. The seal wire will provide an indication of tampering and possible contamination of the tank contents if either the lead seal or the wire loop is broken. All the metal components of the vent are preferably made of stainless steel to avoid corrosion problems and to minimize the costs for maintenance of the vent structure.

An important advantage of the two-way vent arrangement of the present invention is the provision of an effective tamper-proof vent by means of a very simple and economical vent construction.

Another advantage of the present invention is its ready adaptability for use as a tamper-proof vent on many different types of receptacles an enclosures containing a wide variety of materials.

BRIEF DESCRIPTION OF THE DRAWINGS

In view of the foregoing and other advantages and features of the invention that will become hereinafter apparent to those skilled in the art, the nature of the invention may be more clearly understood by reference to the following detailed description of the presently preferred embodiment of the invention, the appended claims and to the several views illustrated in the accompanying drawings, in which:

FIG. 4 is an exploded perspective view showing all the components of the vent arrangement and alternative filter elements; and FIG. 5 is a fragmentary side elevation view, partly in section, similar to FIG. 3 showing the filter arrangement of FIG. 4.

DETAILED DESCRIPTION OF A PREFERRED EMBODIMENT

Figure 1:
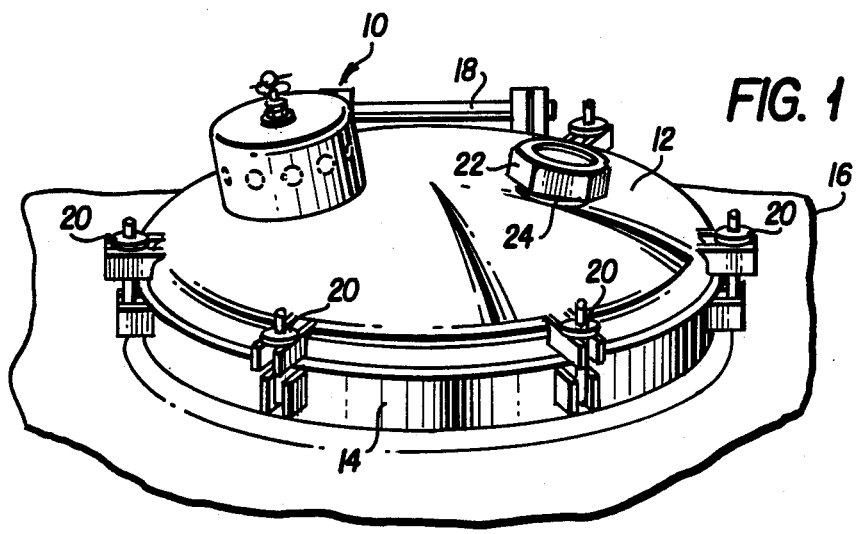
FIG. 1 is a perspective view showing the vent arrangement of the present invention installed on the pivotable hatch cover or lid of a partially shown food grade tank receptacle.

Referring now in detail to the drawings wherein like parts are designated by like reference numerals throughout, there is illustrated in perspective in FIG. 1 a preferred vent means or arrangement according to the invention which is designated generally by reference numeral 10. In the embodiment shown in FIG. 1, the vent 10 is operatively mounted to a hatch cover or lid 12 (also known as a manhole cover) which sealingly engages the coaming 14 of an opening in a food grade tank 16. It should be understood that the embodiment illustrated in FIG. 1 is only one of many possible uses of the vent of the present invention.

The cover 12 is hingedly mounted to the coaming 14 by hinge means 18 of conventional construction and is sealingly secured to the coaming 14 by a plurality of mechanical dogs or fasteners 20 spaced about the circumference of the cover 12, also according to conventional construction. Locking means (not shown) are preferably provided for locking the cover 12 to the coaming 14 to prevent unauthorized access to the contents of the tank 16 via the cover. A vent nut closure 22 is shown on cover 12 and closes an opening in the cover comprising an externally threaded tubular neck 24 mounted in the cover 12. The vent 10 is mounted to an opening formed by a corresponding tubular neck 25 (see FIGS. 2 and 3) in the cover 12.

Figure 2:
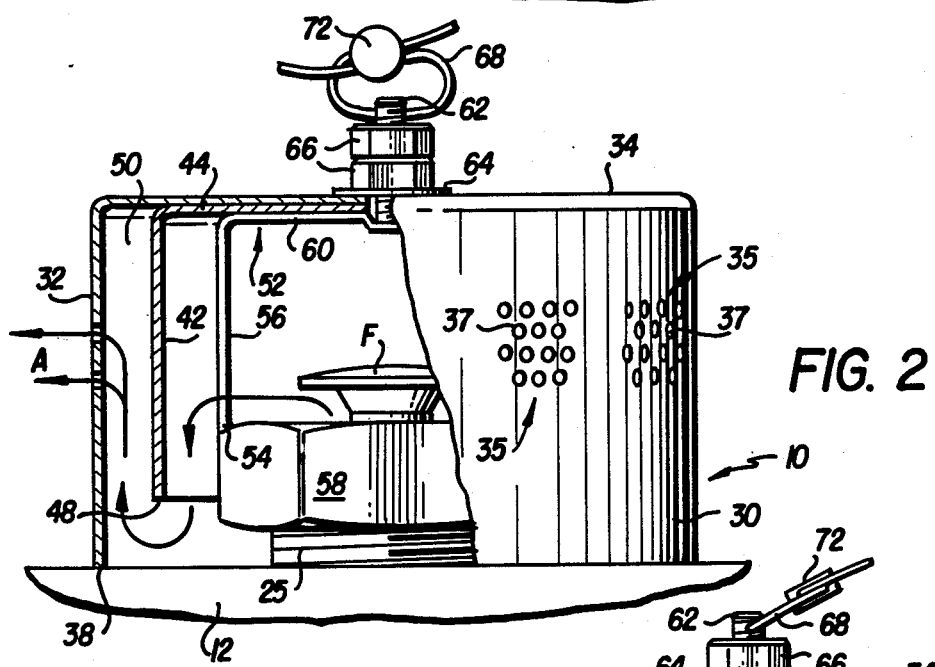
FIG. 2 is a side elevation view, partly in section, of the vent arrangement of the present invention illustrating the path of outward venting flow.
Figure 3:
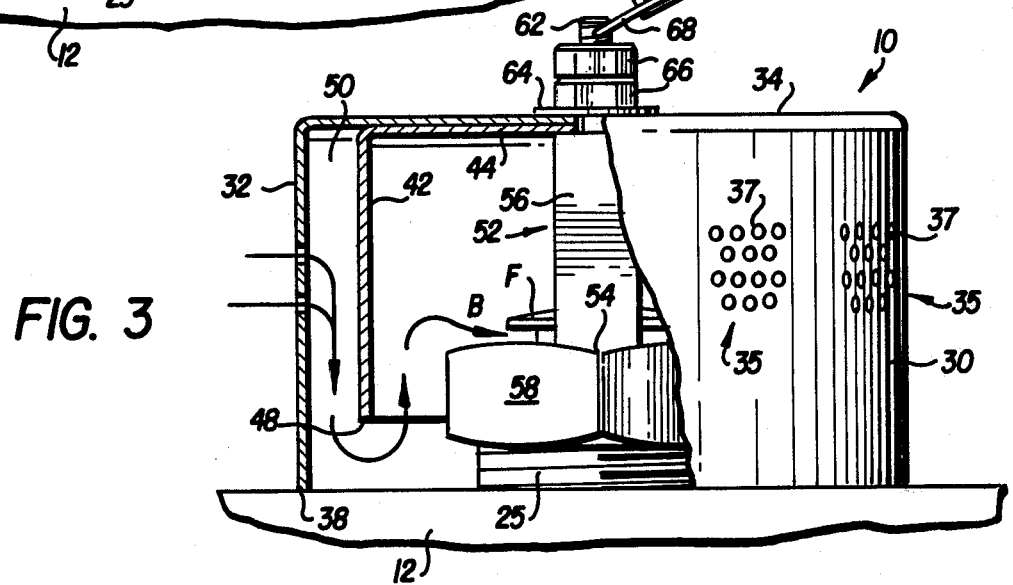
FIG. 3 is a side elevation view, partly in section, of the vent arrangement of the invention shown at right angles to the view of FIG. 2 and illustrating the path of inward venting flow.

Referring now to FIGS. 2 and 3, the vent arrangement 10 comprises two inverted cylindrical cup members, an outer cup member 30 and an inner cup member 40. Outer cup member 30 has a cylindrical wall 32 and a flat circular wall 34 at one end thereof with a central hole 36 extending therethrough. The outer end of cup member 30 is open and has a free circumferential lower edge 38.

The wall 32 of the outer cup member is provided with a plurality of groups 35 of small openings 37 having a diameter in the preferred range of 1/16 to 3/16 inches. As shown in the drawings, the groups 35 of openings are located more than half the height of wall 32 above the lowermost edge 38 of the cup member 30. While the positioning of the hole groups 35 in the wall 32 is not particularly critical, it is advantageous to locate the holes 37 closer to the upper edge or end wall 34 of the cup member rather than the lower edge 38 for reasons which will become hereinafter apparent.

Inner cup member 40 is constructed similarly to cup member 30 with a cylindrical wall 42 and a flat circular wall 44 at one end thereof with a central hole 46 extending therethrough. The other end of cup member 40 is also open and has a free circumferential lower edge 48. Cup member 40 is smaller in diameter and height than cup member 30 so that when the cup members 30,40 are nested as shown in FIGS. 2 and 3 with the holes 36,46 thereof in registry, there is provided an annular space 50 between the cup walls 32,42. The lower edge 48 of inner cup 40 lies in a plane spaced above a plane containing the lower edge 38 of outer cup 38, i.e., toward the end walls 34,44 of the cup members, to provide an annular passageway from the interior of cup member 40 to the annular space 50.

The cup members 30,40 are bolted to a three-legged, C-shaped bracket or strap 52 welded at the ends 54 of its vertical legs 56 to a conventional hexagonal vent nut 58. Vertical legs 56 of the bracket 52 are connected by a horizontal leg 60 and a threaded stud or bolt 62 is welded or otherwise affixed to the midpoint of leg 60.

The assembly of the vent arrangement 10 is considered to be evident from the drawing figures and from the foregoing description of the vent components. Nevertheless, the following brief explanation of the vent assembly will aid in a thorough understanding of the invention. Assembly begins by inserting a conventional fitting F, known as an Olson valve, in the opening provided by the tubular, externally theaded neck 25 extending upwardly from hatch cover 12. Fitting F forms no part of the present invention and the description thereof is included only in the interest of completeness.

Vent nut 58, together with the bracket 52 attached thereto, is threaded onto tubular neck 25 and tightened with a wrench until the fitting F is held securely in place in the opening of the tubular neck by an annular lip (not shown) on the vent nut adjacent the thread thereof. The inner and outer cup members 40,30 are then placed on the bracket 52 so that the threaded stud 62 extends through the holes 46,36 of the cup members. The inside surface of end wall 44 of the inner cup member 40 bears on the leg 60 of the bracket 52 and the inside surface of end wall 34 of the outer cup member bears on the end wall 44 of the cup member 40. The circumferential lower edge 48 of the inner cup member 40 is spaced above the surface of the cover 12 and the circumferential lower edge 38 of the outer cup member 30 bears upon the surface of cover 12. In that arrangement, a labyrinth or sinuous path is formed for the egress or ingress of venting flow as shown by the paths identified by arrows A and B in FIGS. 2 and 3, respectively.

A washer 64 and a pair of nuts 66, e.g., locking nuts, are threaded onto stud 62 and tightened to hold the cup members 30,40 in place. Thereafter, a wire or cable 68 is passed through a diametrical hole 70 (FIG. 4) in the free end of stud 62 and is secured with a security seal 72, such as a lead seal or the like.

Although the vent arrangement shown in FIGS. 2 and 3 is satisfactory for most applications including food grade applications, it is possible to employ additional filter media in the vent, especially in the annular space 50 between the inner and outer cup members 30,40. As shown in FIGS. 4 and 5, such additional filter media may include, for example, a metal screen or corrugated paper filter 80 and/or a nonwoven fibrous filter 82, such as steel wool or the like. Such additional filters may be used to filter airborne particulate matter from atmospheric air entering the tank along the path B of FIG. 3, for example.

For food grade applications all the components of the vent arrangement 10 are preferably made of stainless steel. As an alternative to the holes 37 in the wall 32 of cup member 30, it is possible to provide a single, relatively large diameter (½ to 1 inch) hole in lieu of each group 35 of holes and to weld or rigidly affix a metal mesh screen, preferably stainless steel, on the interior surface of the wall 32 of the cup member 30.

Other possible modifications to the invention include the provision of very shallow undulations or recesses in the lower edge 38 of the outer cup member to enhance drainage of liquids intentionally flooded or naturally induced into the interior of the vent arrangement. In addition, modifications may be made to the vent structure to lengthen the labyrinth path for inflow and outflow of venting air. For example, positioning of the holes 37 closely adjacent the upper edge or end wall 34 of the outer cap member would lengthen the labyrinth path and render tampering even more difficult. Likewise, increasing the height of the vent nut 58 by mounting an annular ring on the top of the vent nut would also lengthen the labyrinth path.

From the foregoing description, it should be apparent that the vent arrangement of the present invention advantageously provides a secure, tamper-proof vent for a food grade tank or any other receptacle or enclosure with which it is used. It will also be appreciated that many other modifications and variations of the present invention may be made in light of the above teachings without departing from the spirit and scope of the invention. Accordingly, it is intended that the invention be limited only to the extent required by the appended claims and the applicable rules of law.

What I claim is:

1. A vent for a receptacle comprising a vent opening structure and inner and outer cup members, bracket means mounted to the vent opening structure for securing the inner and outer cup members to the vent opening structure, said vent opening structure comprising a tubular neck mounted to the receptacle, said bracket means comprising a vent nut for removable connection to the tubular neck and an upstanding bracket mounted to said vent nut, each cup member comprising a tubular wall having one closed end and one open end, the inner cup member having a cross-sectional area and an end-to-end height less than the corresponding area and height of the outer cup member, said outer cup member having flow openings in the wall thereof, the inner cup member being nested in the outer cup member and the nested cup members being mounted to said upstanding bracket.

2. A vent according to claim 1, in which the walls of said cup members are cylindrical, said inner cup member being coaxially nested in the outer cup member to form an annular space between the cylindrical walls of said cup members.

3. A vent according to claim 2, in which said cup members each have an annular edge at the open end thereof, the annular edge of the outer cup member being in contact with the receptacle surface surrounding the vent opening, the annular edge of the inner cup member being spaced from the receptacle surface surrounding the vent opening to form a passage from the annular space to the interior of the inner cup member.

4. A vent according to claim 3, in which the annular edge of the outer cup member is slightly spaced from the receptacle surface at circumferentially spaced points to permit the outflow of fluid from the interior of the outer cup member.

5. A vent for a receptacle having a vent opening structure comprising inner and outer cup members, each cup member comprising a tubular wall having one closed end and one open end, the inner cup member having a cross-sectional area and an end-to-end height less than the corresponding area and height of the outer cup member, said outer cup member having flow openings in the wall thereof, said inner cup member being disposed within the outer cup member, the open ends of said cup members covering the vent opening structure in the receptacle to provide a labyrinth path for the inflow and outflow of air through said vent, the walls of said cup members being cylindrical, said inner cup member being coaxially nested in the outer cup member to form an annular space between the cylindrical walls of said cup members, and filter means disposed in said annular space for filtering the air flow along the labyrinth path of the vent.

6. A vent according to claim 5, in which said filter means comprises at least one of a mesh screen filter, corrugated paper filter or nonwoven fibrous filter.

7. A vent according to claim 4, in which said upstanding bracket has first and second upstanding legs connected at the lower ends thereof to the vent nut and at the upper ends thereof to a third leg, said third leg having an upstanding threaded stud affixed substantially at the midpoint thereof, said cup members having holes extending through the closed ends thereof, said threaded stud passing through said holes in the cup members.

8. A vent according to claim 7, in which said threaded stud has a diametrical hole therethrough adjacent the free end thereof, at least one nut theaded onto said stud past said diametrical hole and a wire passing through said diametrical hole, said wire having a security seal thereon.

9. A vent according to claim 1, in which the tubular neck is externally theaded and the vent nut is internally threaded, said vent nut being threadably received on the tubular neck of the vent opening structure.

10. A vent according to claim 1, in which said cup members are made of stainless steel.

11. A vent according to claim 1, in which said receptacle is a food grade tank having a hatch cover sealingly and hingedly mounted to the tank, said vent opening structure being disposed in said cover.

12. A vent according to claim 1, in which the flow openings have a size sufficiently small to inhibit the intentional or inadvertent introduction of a tube or other foreign object into the vent opening structure.

13. A vent according to claim 12, in which said openings are formed in a plurality of groups about the circumference of the wall, each opening having a diameter in the range of from 1/16 to 3/16 inches.

14. A vent according to claim 12, in which said openings are disposed in said wall at a greater distance from the open end of the outer cup member than from the closed end of the outer cup member.

15. A tamper-proof two-way vent for a receptacle or enclosure having a vent opening structure comprising a bracket mounted on said vent opening structure, a first inverted, cylindrical cup member mounted to said bracket over said opening, said first cup member having an open end defined by an annular edge, the annular edge of the first cup member being spaced from the surface of the receptacle or enclosure, a second inverted, cylindrical cup member mounted to said bracket over said first cup member, said second cup member having an open end defined by an annular edge, the annular edge of the second cup member contacting the surface of the receptacle or enclosure, and a plurality of flow openings in said second cup member disposed at a height above the annular edge of the first cup member to provide a labyrinth path of inflow and outflow of air through said vent.

16. A vent according to claim 15, including means for securing said cup members to said bracket and antitamper means on said securing means for providing an indication that said securing means has been tampered with.

17. A vent according to claim 16, in which said first and second cup members have closed ends opposite the open ends thereof and through holes in the center of the closed ends, said securing means comprising a threaded stud on said bracket passing through the holes in the closed ends of the cup members and at least one nut threaded onto said stud for fastening the cup members to the bracket.

18. A vent according to claim 17, in which said bracket is affixed to a vent nut, said vent opening structure comprising a tubular neck with an external thread, said vent nut being threaded onto said tubular neck.

19. A vent for a receptacle having a vent opening structure comprising inner and outer cup members, each cup member comprising a tubular wall having one closed end and one open end, the inner cup member having a cross-sectional area and an end-to-end height less than the corresponding area and height of the outer cup member, said outer cup member having flow openings in the wall thereof, said inner cup member being disposed within the outer cup member, the open ends of said cup members covering the vent opening structure in the receptacle to provide a labyrinth path for the inflow and outflow of air through said vent, the walls of said cup members being cylindrical, said inner cup member being coaxially nested in the outer cup member to form an annular space between the cylindrical walls of said cup members, said cup members each having an annular edge at the open end thereof, said open ends confronting the receptacle surface surrounding the vent opening, the annular edge of the outer cup member being in contact with said receptacle surface, the annular edge of the inner cup member being spaced from said receptacle surface to form a passage from the annular space around the annular edge of the open end of the inner cup member and to the interior of the inner cup member.

* * * * *